United States Patent [19]
Enderlein et al.

[11] Patent Number: 5,983,566
[45] Date of Patent: Nov. 16, 1999

[54] CONTAINER FOR GROWING AND TRANSPLANTING FLOWERS AND PLANTS

[76] Inventors: Jorg Enderlein, 71 Main Street, Lisle, Canada, L0M 1M0; Arnd Enderlein, 428 Courdingan Dr., Barrie, Canada

[21] Appl. No.: 08/964,386

[22] Filed: Nov. 6, 1997

[51] Int. Cl.$^6$ ............................................. A01G 23/02
[52] U.S. Cl. ................................... 47/73; 47/74; 47/66.7
[58] Field of Search ......................... 47/19, 28.1, 74, 47/30, 32, 66.2, 65.5, 68.6, 68, 75, 78, 73, 48.5, 72; D11/144

[56] References Cited

U.S. PATENT DOCUMENTS

| | | | |
|---|---|---|---|
| 31,306 | 2/1861 | Eberhardt | 47/71 |
| 1,113,350 | 10/1914 | Inman | 47/74 |
| 1,192,824 | 7/1916 | Bohlman | 47/73 |
| 1,331,261 | 2/1920 | Hornsby | 47/74 |
| 1,426,808 | 8/1922 | Bailey | 47/74 |
| 3,315,410 | 4/1967 | French | 47/34 |
| 3,844,987 | 10/1974 | Clendinning et al. | 47/74 R |
| 4,014,506 | 3/1977 | Hanson | 248/311.1 |
| 4,106,235 | 8/1978 | Smith | 47/59 |
| 4,223,480 | 9/1980 | Welty | 47/73 |
| 4,224,764 | 9/1980 | Dziewulski | 47/71 |
| 4,232,482 | 11/1980 | Watt | 47/71 |
| 5,044,119 | 9/1991 | Hougard | 47/66 |
| 5,103,587 | 4/1992 | Holler | 47/75 |
| 5,174,061 | 12/1992 | Dambricourt | 47/72 |

FOREIGN PATENT DOCUMENTS

| | | | |
|---|---|---|---|
| 206369 | 10/1955 | Australia | 47/74 R |
| 1003489 | 12/1954 | Germany | 47/41.11 |
| 2286013 | 11/1990 | Japan | 47/74 |
| 183328 | 6/1992 | Japan | 47/74 R |

*Primary Examiner*—Michael J. Carone
*Assistant Examiner*—Son T. Nguyen
*Attorney, Agent, or Firm*—Merek & Voorhees

[57] ABSTRACT

A container for growing and transplanting flowers and plants. The container includes a rigid outer shell, having enclosed sides, an enclosed bottom and an open top, and an inner planting pot formed from a decomposable material and having enclosed sides, an enclosed bottom and an open top. The inner planting pot is releasably receivable within the rigid outer shell such that when the inner planting pot is received within the rigid outer shell the bottom of the inner planting pot is supported on the bottom of the rigid outer shell. The enclosed sides of the rigid outer shell are sloped inwardly from its open top to its enclosed bottom. The enclosed sides of the inter planting pot are sloped inwardly from its open top to its bottom to a greater degree than the slope of the sides of the rigid outer shell. An annular air space is created between the inter planting pot and the rigid outer shell when the inner planting pot is received within the rigid outer shell. The annular air space is larger at the bottom of said container than at the top.

9 Claims, 3 Drawing Sheets

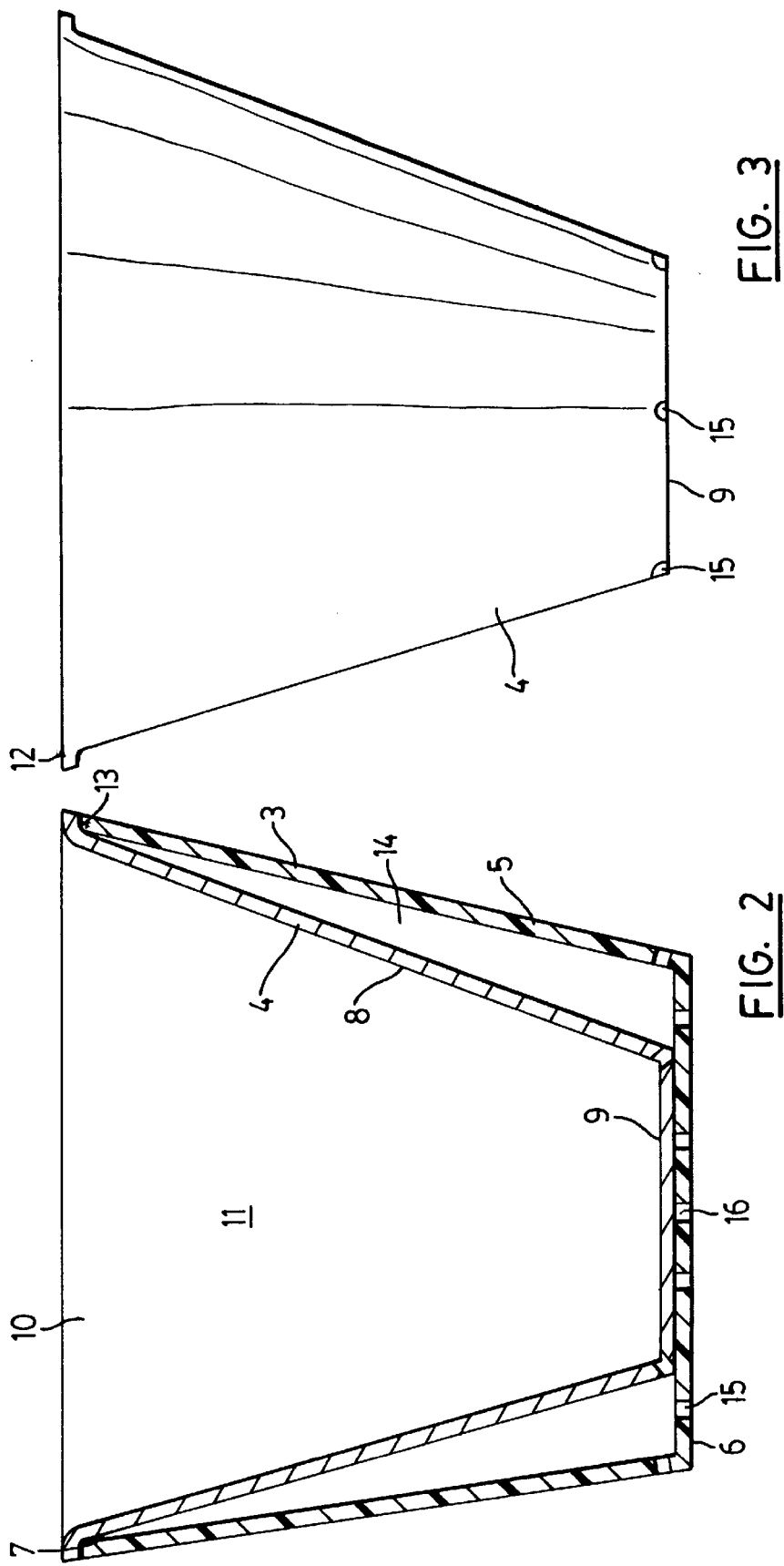

5,983,566

CONTAINER FOR GROWING AND TRANSPLANTING FLOWERS AND PLANTS

FIELD OF THE INVENTION

This invention relates to containers that may be used for growing and transplanting flowers and plants, and particularly containers that serve the dual function of providing a rigid structure for purposes of transportation and that also provide a decomposable structure that readily breaks down when planted in the ground and that allows for easy penetration of a plants' root system therethrough.

BACKGROUND OF THE INVENTION

Planting pots and containers have been used for decades for purposes of growing flowers, small plants and shrubs in an indoor or outdoor setting. More recently pots and containers have been used on a commercial scale for growing plants and flowers so that they are readily transportable for purposes of sale and transplanting elsewhere. For example, nurseries often use planting pots as a means to grow small plants and shrubs in a contained environment so as to reduce the need to physically dig the plant from a field grown setting for purposes of sale and transplanting. When grown in a container plants also tend to remain somewhat healthier as the root system and the soil surrounding the plant's roots is only disturbed once; namely, when the plant is removed from the container to be transplanted. Traditionally a plant's roots are disturbed twice when transplanted, once when the plant is extracted from the ground and again when it is re-planted.

In order to provide protection to a plant's root system when it is either growing or being transported within a planting pot or container, such containers have traditionally been made from plastic or some other rigid material. While these materials serve the intended purpose of providing protection for the root system, they are not biodegradable and it is necessary for the plant to be removed from the container prior to transplanting in the ground. When a plant's root system is removed from a container it is inevitably damaged to some degree. The damage is particularly prevalent in cases where the root system is extensive and fills much or all of the container. It is also relatively common to transplant plants and flowers when they are in full bloom, a point during a plant's life cycle when root and transplanting shock is usually most severe.

To combat this problem others have proposed the use of containers comprised of materials that are somewhat biodegradable and that may be planted directly into the ground without the need to remove the plant contained within them. However, such containers typically suffer from one of two limitations. First, in order to ensure that the container quickly decomposes within the ground so that the plant's root system can be released and is not unduly confined, some containers have been made from a relatively thin decomposable material. Unfortunately those containers tend to have very little rigidity or structural integrity and do not function adequately as a transportation medium. Such containers are therefore not able to be used effectively for growing the plant from seed or for transporting a plant from one location to another. On the other hand, pots that are made of a more rigid and sound material provide an enhanced ability to protect the root system and allow for easier transportation, but do not readily decompose. When planted in the ground they tend to cause the root system of a plant to remain confined within them. It therefore often becomes necessary to physically cut the container open to or remove large portions of its sides in order to allow the plant's roots to escape. In either case root damage often occurs.

There is therefore a need for a container for growing and transporting flowers and plants that provides a rigid structure to protect the root system and that also provides a structure that is readily decomposable such that when it is planted in the ground it will quickly disintegrate and allow the plant's roots to grow freely within the ground.

SUMMARY OF THE INVENTION

The invention therefore provides a container for growing and transplanting flowers and plants where the container includes both a rigid outer shell and an inner planting pot that is comprised of a decomposable material. The rigid outer shell provides the safety necessary for growing and transporting a plant while the inner planting pot, when planted within the ground, quickly and easily decomposes so as to prevent limitations on the growth of the plant's root system. The invention also provides a unique structure of a rigid outer shell and inner planting pot that allows the two parts to be easily separated without damage to the plant's root system.

Accordingly, in one of its aspects the invention provides a container for growing and transplanting flowers and plants comprising a rigid outer shell having enclosed sides, an enclosed bottom and an open top; and, an inner planting pot comprised of a decomposable material and having enclosed sides, an enclosed bottom and an open top, said inner planting pot releasably receivable within said rigid outer shell such that when said inner planting pot is received within said rigid outer shell said bottom of said inner planting pot is supported on said bottom of said rigid outer shell, said enclosed sides of said rigid outer shell being sloped inwardly from said open top to said enclosed bottom of said rigid outer shell and said enclosed sides of said inter planting pot being sloped inwardly from said open top to said bottom of said inner planting pot to a greater degree than the slope of said sides of said rigid outer shell such that an annular air space is created between said inter planting pot and said rigid outer shell when said inter planting pot is received within said rigid outer shell, said annular air space being larger at the bottom of said container than at the top.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which:

FIG. 2 is a side sectional view taken along the line 2—2 of FIG. 1;

FIG. 3 is a side view of the inner planting pot of the present invention;

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
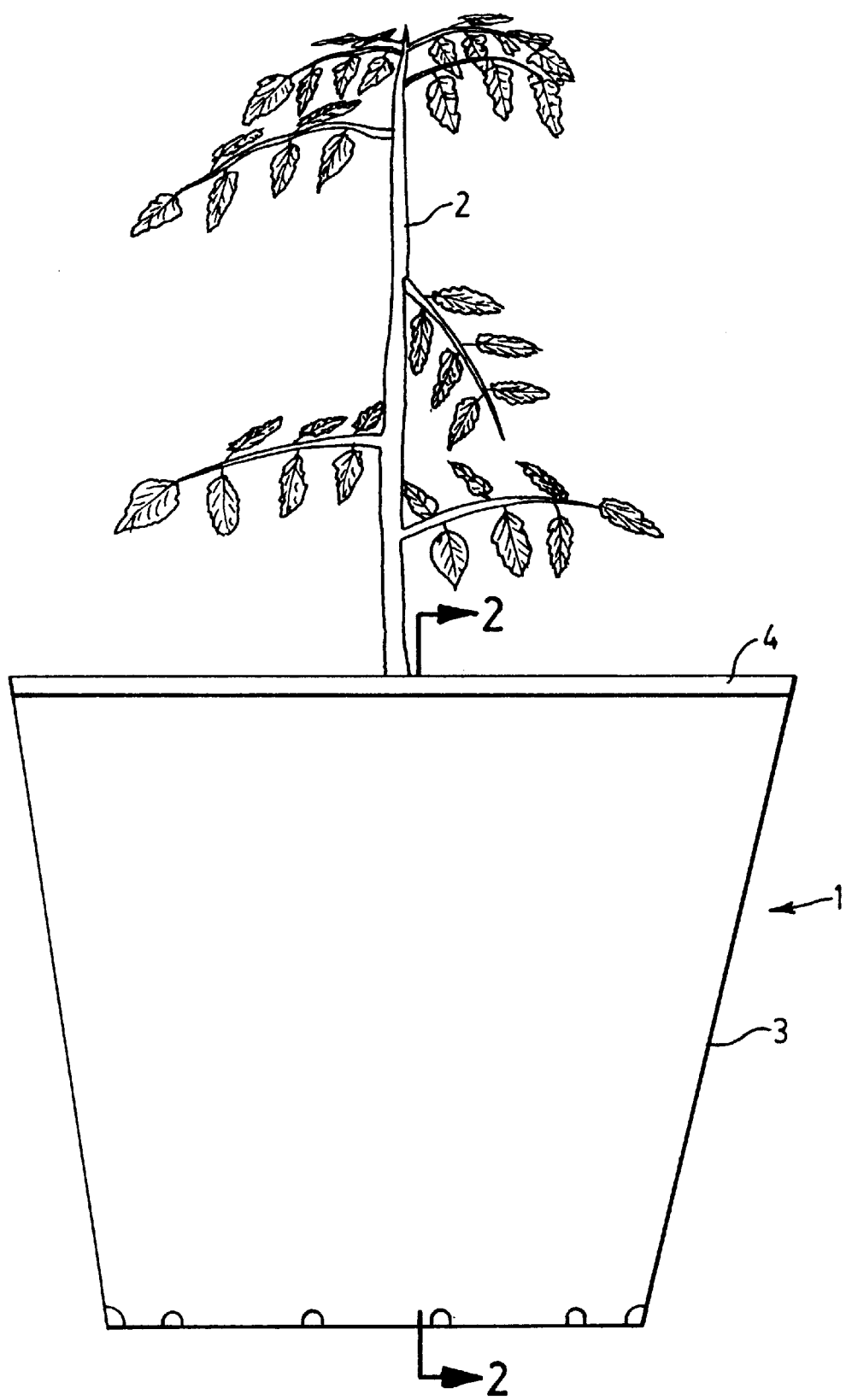
FIG. 1 is a side view of the present invention showing a plant growing therein.
Figure 4:
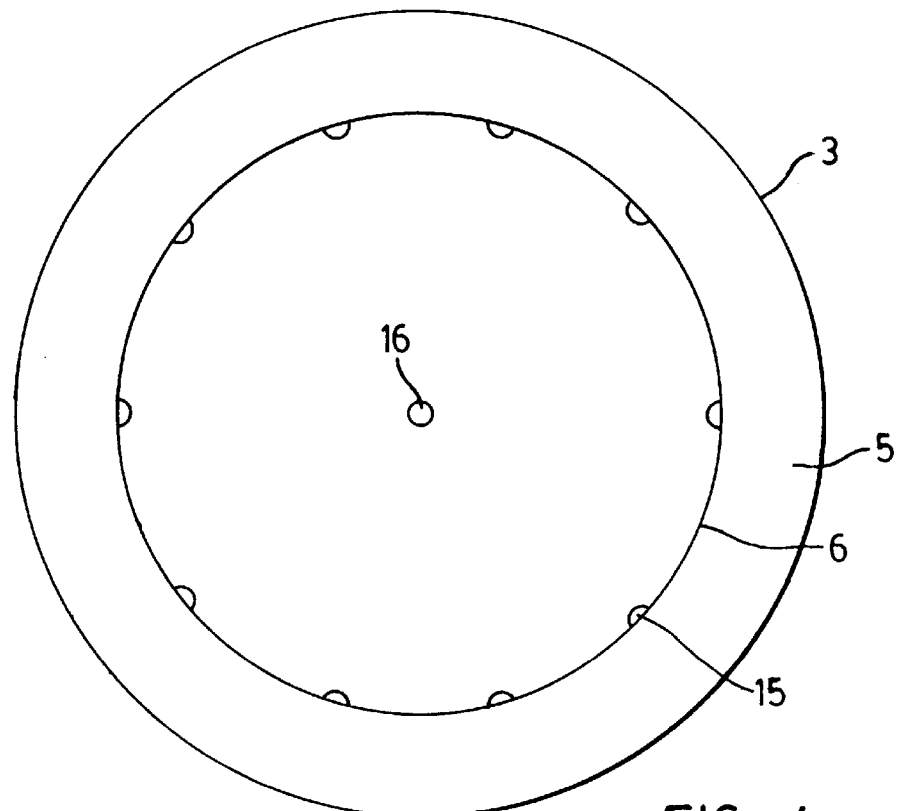
FIG. 4 is a bottom view of the device shown in FIG. 2.

With reference to FIG. 1, the container for growing plants and flowers of the present invention is generally identified by the reference numeral 1. In FIG. 1, container 1 is shown as containing a plant or flower 2. Container 1 is comprised generally of a rigid outer shell 3 and an inner planting pot 4. Rigid outer shell 3 has enclosed sides 5, an enclosed bottom 6 and an open top 7. Similarly, inner planting pot 4 also has enclosed sides 8, an enclosed bottom 9 and an open top 10.

The particular structure of inner planting pot 4 is shown more clearly in FIGS. 2 and 3. Inner planting pot 4 is constructed of a size such that it is releasably receivable within the interior 11 of rigid outer shell 3. When inner planting pot 4 is received within rigid outer shell 3 the enclosed bottom 9 of the inner planting pot is supported upon enclosed bottom 6 of rigid outer shell 3. In a preferred embodiment of the invention, rigid outer shell 3 and inner planting pot 4 each contain rim members, 12 and 13 respectively, at the uppermost portions of their respective sides. Rim members 12 and 13 define open tops 7 and 10 of the rigid outer shell and the inner planting pot and are in contact with one another when inner planting pot 4 is received within outer shell 3. That is, when the inner planting pot is placed within the rigid outer shell, rim member 12 of inner planting pot 4 rests upon rim member 13 of rigid outer shell 3. In this manner rim member 12 serves as a means to support both rim member 13 and the upper portion of inner planting pot 4. Through the resting of rim member 13 upon rim member 12 a loose seal is also formed between inner planting pot 4 and rigid outer shell 3 so as to prevent debris from entering between the inner pot and the outer shell.

Referring specifically to FIG. 2, enclosed sides 5 of rigid outer shell 3 are sloped inwardly from open top 7 to enclosed bottom 6. In a similar manner enclosed sides 8 of inner planting pot 4 also slope inwardly from open top 10 to enclosed bottom 9, but to a greater degree than the slope of sides 5 of rigid outer shell 3. It will thus be appreciated that while rim members 12 and 13 are of approximately the same or similar size, enclosed bottoms 6 and 9 are not. Enclosed bottom 9 is smaller than enclosed bottom 6. With this configuration of inner planting pot 4 and rigid outer shell 3, when the inner planting pot is received within the outer shell an annular air space 14 is created between planting pot 4 and shell 3. It will be understood that due to the increased slope of the sides of the inner planting pot, the annular air space 14 will be larger at the bottom of container 1 than at its top.

Both rigid outer shell 3 and inner planting pot 4 also contain drainage holes 15 that extend through their bottom surfaces. Drainage holes 15 allow excess water to escape through container 1 to prevent over saturation of soil contained within the container. In addition, rigid outer shell 3 contains a further hole 16 extending through enclosed bottom 6. In a preferred embodiment, hole 16 is centrally positioned in enclosed bottom 6 and provides a means for the insertion of an object so as to apply pressure against enclosed bottom 9 of inner planting pot 4 to assist in the removal of the inner planting pot from within rigid outer shell 3. When inner planting pot 4 is filled with soil and the root system of a plant the weight of the material contained within the inner planting pot may be sufficient to effectively seal the inner planting pot within the rigid outer shell. Since in the preferred embodiment inner planting pot 4 is comprised of a relatively thin decomposable material it is also relatively frail making it difficult or impossible in some cases to remove the inner planting pot from the outer shell by merely grasping and pulling upon rim member 13. In many cases doing so will cause the rim member to be torn away from the remainder of inner planting pot 4, thereby making it even more difficult to remove the inner pot.

Accordingly, hole 16 provides a means through which an object can be inserted through rigid outer shell 3 in order to apply pressure against the bottom of inner planting pot 4 and to assist in its removal from the outer shell.

Figure 5:
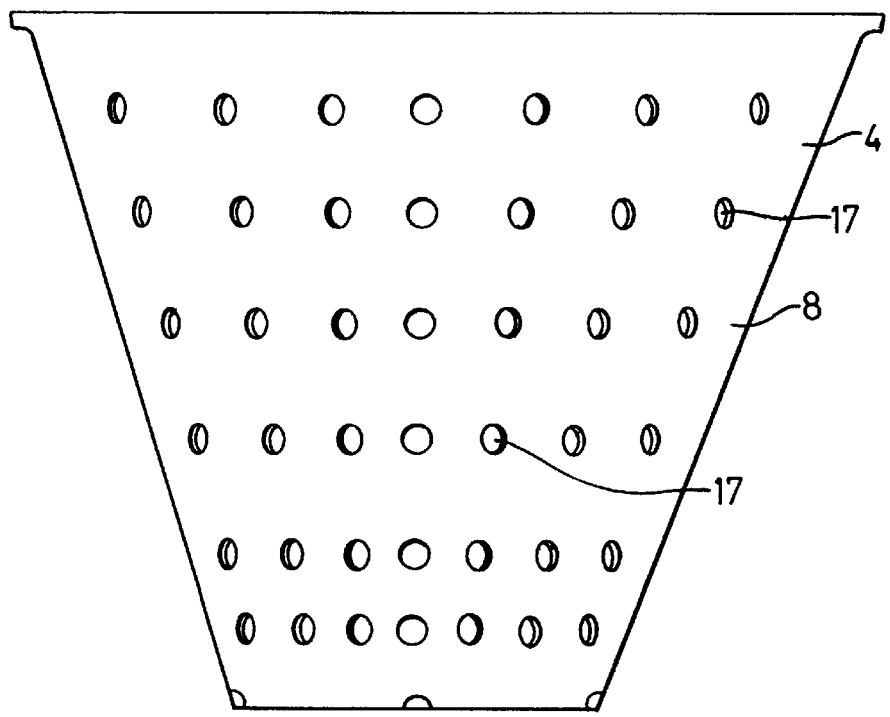
FIG. 5 is a side view of an alternate embodiment of the inner planting pot shown in FIG. 3.

In an alternate embodiment, and as shown more specifically in FIG. 5, inner planting pot 4 includes a series of perforations 17 through its side surfaces 8. Perforations 17 serve the purpose of facilitating the decomposition of the inner planting pot when it is planted in the ground through increasing the surface area over which enzymes, bacteria and insects within the ground can act. Perforations 17 also assist in providing a means for the root system of the flower or plant contained within the inner planting pot to more readily escape the confines of the pot.

In use, inner planting pot 4 is inserted within rigid outer shell 3 and filled with soil such that a plant, shrub or flower 2 may be grown therein. Enclosed bottom 9 of inner planting pot 4 will rest upon enclosed bottom 6 of rigid outer shell 3 such that the weight of the soil and plant is effectively born by the rigid outer shell. In addition, rim member 12 of the inner planting pot also rests upon rim 13 of the outer shell to further help support the inner pot and to create a form of seal between the inner pot and the outer shell and thereby preventing debris from entering annular air space 14.

The increased slope of sides 8 of inner planting pot 4 relative to sides 5 of rigid outer shell 3 creates an annular air space between the two respective pots that is larger at the bottom of container 1 than at the top. In this way inner planting pot 4 may be more easily removed from rigid outer shell 3, particularly when it is saturated with water and filled with soil. That is, as inner planting pot 4 is effectively tapered towards its bottom end to a greater degree than the slope of sides 5 of outer shell 3, once the "seal" between rim members 12 and 13 has effectively been broken the inner planting pot can be easily removed without interference or binding upon the sides of the rigid shell. In addition, when inner planting pot 4 becomes wet it and its contents tend to swell. The increase in the size of annual air space 14 toward the bottom of container 1 helps to reduce the frictional contact between inner planting pot 4 and the interior of rigid outer shell 3 under circumstances where the inner pot has swollen, making removal of inner planting pot 4 easier. The increased slope of the sides of the inner planting pot also create a conical shaped pot that is more easily transplanted into the ground than one having a more cylindrical shape.

Preferably, rigid outer shell 3 is comprised of plastic, wood, ceramic, metal or similar material that will provide a strong and rigid structure to protect both the inner planting pot and the plant's root system during growing and transportation. When it becomes desirable to transplant the plant contained within inner planting pot 4 into the ground, an object may be inserted through hole 16 to apply pressure against bottom 9 of inner planting pot 4. This additional force, effectively applied to the bottom of the inner planting pot, helps to ensure that the inner planting pot remains intact during removal and that no damage to the plant's root system occurs. Once removed, inner planting pot 4 can then be transplanted directly into the ground without the root system of the plant contained therein being disturbed. As a result the plant and its root system will not suffer transplanting shock or root damage or breakage. Once it has been transplanted into the ground inner planting pot 4 will quickly begin to decompose. As indicated previously, to assist in the decomposition of inner planting pot 4 a series of holes or perforations 17 may be formed within its side surfaces.

Preferably inner planting pot 4 is comprised of cellulose, saw dust, peat most, or a paper mache material. In the preferred embodiment inner planting pot 4 does not contain binders or additives, such as asphalt or paraffins, that have the effect of deterring decomposition. However, if desired inner planting pot 4 may contain fertilizer compounds that are deposited into the ground upon decomposition of the pot. Since it is devoid of binders, inner planting pot 4 may be formed by way of vacuum moulding or a similar manufacturing process.

It will be appreciated that the formation and construction of inner planting pot 4 as described above will present a structure that will allow a plant's root system to readily penetrate the inner planting pot prior to decomposition of the pot and without the need to physically cut or destroy the pot. In this manner the type of root compaction that is common with traditional planting pots may be eliminated. That is, rather than being confined to the interior of the planting pot, a plant's root system is able to penetrate through the sides of the pot, both when inner planting pot 4 is held within outer shell 3 and when the inner pot is removed from the shell and planted in the ground. It will also be appreciated that construction of inner planting pot 4 from the above types of materials will enable it to retain moisture and thereby help to prevent drying of the plant's root system. Since outer shell 3 is preferably comprised of a rigid material it will also serve the additional function of helping to prevent inner planting pot 4 from drying out.

It is to be understood that what has been described are the preferred embodiments of the invention and that it may be possible to make variations to these embodiments while staying within the broad scope of the invention. For example, in the attached drawings rigid outer shell 3 is shown as generally cylindrical in shape with inner planting pot 4 having a generally inverted frusto conical shape. However, it will be appreciated that rigid outer shell 3 and inner planting pot 4 could equally take the form of a variety of other geometric shapes. Other variations of the invention that remain within its broad scope will be readily apparent to those skilled in the art.

We claim:

1. A container for growing and transplanting flowers and plants comprising:
    a rigid outer shell having enclosed sides, an enclosed bottom and an open top; and,
    an inner planting pot comprised of a decomposable material and having enclosed sides, an enclosed bottom and an open top, said inner planting pot removable and releasably receivable within said rigid outer shell such that when said inner planting pot is received within said rigid outer shell said bottom of said inner planting pot is supported on said bottom of said rigid outer shell,
    said enclosed sides of said rigid outer shell being sloped inwardly from said open top to said enclosed bottom of said rigid outer shell and said enclosed sides of said inner planting pot being sloped inwardly from said open top to said bottom of said inner planting pot to a greater degree than the slope of said sides of said rigid outer shell such that an annular air space is created between said inner planting pot and said rigid outer shell when said inner planting pot is received within said rigid outer shell, said annular air space being larger at the bottom of said container than at the top and facilitating in the removal of said inner planting pot from said rigid outer shell when said inner planting pot, having retained therein soil and a flower or plant, is removed from said rigid outer shell and transplanted into the ground; wherein said rigid outer shell is generally cylindrical in shape and said inner planting pot has a generally inverted frusto conical shape such that when inner planting pot is received within said rigid shell the distance between the respective sides of said rigid outer shell and said inner planting pot is greater at the bottom of said container than at the top; wherein said rigid outer shell and said inner planting pot have rim members at the uppermost portion of their respective sides, said rim members defining said open tops of said rigid outer shell and said inner planting pot, when said inner planting pot received within said rigid outer shell said rim member of said inner planting pot resting upon said rim member of said rigid outer shell thereby preventing debris from entering said annular air space.

2. A device as claimed in claim 1 wherein said rigid outer shell includes a hole through its enclosed bottom, said hole providing a means for the insertion of an object to apply pressure against said enclosed bottom of said inner planting pot and to assist in the removal of said inner planting pot from within said rigid outer shell.

3. A device as claimed in claim 2 wherein said rigid outer shell and said inner planting pot contain drainage holes.

4. A device as claimed in claim 3 including a series of perforations in said sides of said inner planting pot, said perforations facilitating decomposition of said inner planting pot when said pot is planted in the ground and providing a means for the roots of a flower or plant retained in said inner planting pot to extend from and escape the confines of said inner planting pot.

5. A device as claimed in claim 4 wherein said inner planting pot is comprised of cellulose.

6. A device as claimed in claim 4 wherein said inner planting pot is comprised of paper mache.

7. A device as claimed in claim 4 wherein said inner planting pot contains fertilizer.

8. A method for growing and transplanting flowers and plants comprising the steps of:
    providing a rigid outer shell having enclosed sides, an enclosed bottom and an open top, said enclosed sides of said rigid outer shell being sloped inwardly from said open top to said enclosed bottom of said rigid outer shell;
    providing an inner planting pot having enclosed sides, an enclosed bottom and an open top, said inner planting pot removable and releasably receivable within said rigid outer shell such that when said inner planting pot is received within said rigid outer shell said bottom of said inner planting pot is supported on said bottom of said rigid outer shell, said inner planting pot being formed of a material which is readily decomposable and which permits a root system of plants and flowers to readily penetrate said inner planting pot after said inner planting pot has been planted in the ground, said enclosed sides of said inner planting pot being sloped inwardly from said open top to said bottom of said inner planting pot to a greater degree than the slope of said sides of said rigid outer shell such that an annular air space is created between said inner planting pot and said rigid outer shell when said inner planting pot is received within said rigid outer shell, said annular air space being larger at the bottom of said container than at the top and facilitating in the removal of said inner planting pot from said rigid outer shell when said inner planting pot, having retained therein soil and a flower or plant, is removed from said rigid outer shell and transplanted into the ground; and, separating said inner planting pot from said rigid outer shell for transplanting into the ground.

9. A container for growing and transplanting flowers and plants comprising:

a rigid outer shell having enclosed sides, an enclosed bottom and an open top;

an inner planting pot comprised of a decomposable material and having enclosed sides, an enclosed bottom and an open top, said inner planting pot removable and releasably receivable within said rigid outer shell such that when said inner planting pot is received within said rigid outer shell said bottom of said inner planting pot is supported on said bottom of said rigid outer shell, said enclosed sides of said rigid outer shell being sloped inwardly from said open top to said enclosed bottom of said rigid outer shell and said enclosed sides of said inner planting pot being sloped inwardly from said open top to said bottom of said inner planting pot to a greater degree than the slope of said sides of said rigid outer shell such that an annular air space is created between said inner planting pot and said rigid outer shell when said inner planting pot is received within said rigid outer shell, said annular air space being larger at the bottom of said container than at the top and facilitating in the removal of said inner planting pot from said rigid outer shell when said inner planting pot, having retained therein soil and a flower or plant, is removed from said rigid outer shell and transplanted into the ground; and, wherein said rigid outer shell and said inner planting pot have rim members at the uppermost portion of their respective sides, said rim members defining said open tops of said rigid outer shell and said inner planting pot, when said inner planting pot received within said rigid outer shell said rim member of said inner planting pot resting upon said rim member of said rigid outer shell thereby preventing debris from entering said annular air space.

* * * * *